(12) United States Patent
Ogawa et al.

(10) Patent No.: US 8,099,228 B2
(45) Date of Patent: Jan. 17, 2012

(54) CONTROL APPARATUS FOR INTERNAL COMBUSTION ENGINE

(75) Inventors: Takashi Ogawa, Susono (JP);
Tomoyuki Kogo, Gotenba (JP);
Kazuyasu Iwata, Susono (JP);
Katsuhiro Ito, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 201 days.

(21) Appl. No.: 12/674,591

(22) PCT Filed: Dec. 26, 2008

(86) PCT No.: PCT/JP2008/073682
§ 371 (c)(1),
(2), (4) Date: Feb. 22, 2010

(87) PCT Pub. No.: WO2010/073353
PCT Pub. Date: Jul. 1, 2010

(65) Prior Publication Data
US 2011/0040476 A1 Feb. 17, 2011

(51) Int. Cl.
*F02D 23/00* (2006.01)
*F01L 1/34* (2006.01)
(52) U.S. Cl. ..... 701/108; 701/102; 60/605.2; 123/90.15
(58) Field of Classification Search ............ 701/108, 701/109, 102; 60/605.1, 605.2, 277, 285, 60/287; 123/568.11, 568.19, 568.21, 90.15–90.17
See application file for complete search history.

(56) References Cited

U.S. PATENT DOCUMENTS 5,819,693 A  10/1998 Curtil
8,011,185 B2 *  9/2011 Inoue et al. ............ 701/108

FOREIGN PATENT DOCUMENTS

| EP | 2208877 A1 * | 7/2010 |
|---|---|---|
| JP | A-6-173723 | 6/1994 |
| JP | A-9-505654 | 6/1997 |
| JP | A-11-22499 | 1/1999 |
| JP | A-2001-3757 | 1/2001 |
| JP | A-2004-204745 | 7/2004 |
| JP | A-2008-8226 | 1/2008 |
| JP | A-2008-215327 | 9/2008 |
| JP | 2009103084 A * | 5/2009 |
| JP | 2009138733 A * | 6/2009 |

OTHER PUBLICATIONS

Tomoda, T. et al., "Improvement of Diesel Engine Performance by Variable Valve Train System," Internationales Wiener Motoensymposium, 2009, vol. 30.
International Search Report issued in International Application No. PCT/JP2008/073682; Mailed Dec. 26, 2008.

* cited by examiner

*Primary Examiner* — Hieu T Vo
(74) *Attorney, Agent, or Firm* — Oliff & Berridge, PLC (57) ABSTRACT

A control apparatus for an internal combustion engine, which can generate exhaust pressure pulsation at an early period while suppressing the degradation of volumetric efficiency and can effectively utilize a scavenging effect while softening a torque difference, when a request to enhance the exhaust pressure pulsation is made in the internal combustion engine which includes a variable valve mechanism that makes a valve overlap period changeable, and a variable nozzle type turbocharger.

6 Claims, 6 Drawing Sheets

CONTROL APPARATUS FOR INTERNAL COMBUSTION ENGINE

TECHNICAL FIELD

The present invention relates to a control apparatus for an internal combustion engine.

BACKGROUND ART

So far, for example, Patent Document 1 discloses a valve timing control apparatus of an internal combustion engine which includes a variable valve mechanism that makes changeable a valve overlap period, during which an intake valve open period overlaps with an exhaust valve open period, by changing the valve timing of at least one of the intake and exhaust valves. In this conventional control apparatus, arrangement is made such that the valve timing of intake and exhaust valve is changed such that an exhaust-port arrival timing of a negative pressure wave caused by exhaust pressure pulsation coincides with the valve overlap period of the intake and exhaust valves. According to such control, it becomes possible to make fresh air easily flow into a cylinder from the intake valve and to expel the burnt gas in the cylinder securely using the air that flowed in through the intake valve. That is, a scavenging effect can be achieved. As a result, the quantity of residual gas is reduced and the quantity of fresh air to be taken into a cylinder can be increased. That is, volumetric efficiency can be improved.

[Patent Document 1] Japanese Laid-open Patent Application Publication No. Hei 11-022499

DISCLOSURE OF THE INVENTION

Problems to be Solved by the Invention

There is a known internal combustion engine which includes a variable nozzle type turbocharger as well as a variable valve mechanism such as one included in the above-described conventional internal combustion engine. In a situation in which the quantity of intake air is rather small, such as in an initial period of acceleration of a vehicle, a relatively weak exhaust pressure pulsation is generated. Therefore, in the internal combustion engine including the variable nozzle type turbocharger as well as the variable valve mechanism as described above; when the generation of a strong exhaust pressure pulsation is required, one possible idea would be to control the opening degree of the variable nozzle toward the closing side such as a fully closed position to increase the quantity of intake air. However, if the above-described adjustment of the valve overlap period, which aims to utilize the exhaust pressure pulsation, is performed when the variable nozzle is controlled toward the closing side under the condition of a weak exhaust pressure pulsation, it is cannot be avoided that the opening degree control of the variable nozzle leads to an increase in exhaust pressure, thereby making it harder to achieve the scavenging effect, and the provision of the valve overlap period results in a blow-back of exhaust gas toward the intake side, thereby degrading volumetric efficiency.

On the other hand, when an attempt is made to utilize the scavenging effect after the exhaust pressure pulsation is sufficiently generated, it is desirable to take some measures to prevent a large torque difference from occurring in the internal combustion engine.

The present invention, which has been made to solve the problems as described above, has an object to provide a control apparatus for an internal combustion engine, which can generate exhaust pressure pulsation at an early period while suppressing the degradation of volumetric efficiency and can effectively utilize a scavenging effect while softening a torque difference, when a request for the enhancement of the exhaust pressure pulsation is made in the internal combustion engine which includes a variable valve mechanism which makes a valve overlap period changeable, and a variable nozzle type turbocharger.

Means for Solving the Problem

A first aspect of the present invention is a control apparatus for an internal combustion engine, the control apparatus comprising:

a variable valve mechanism which makes variable a valve overlap period, in which an intake valve open period overlaps with an exhaust valve open period;

overlap period control means for controlling the variable valve mechanism to control the valve overlap period;

a turbocharger which includes a turbine driven by exhaust energy of the internal combustion engine, and a variable nozzle for adjusting an flow rate of exhaust gas supplied to the turbine;

nozzle opening degree control means for controlling an opening degree of the variable nozzle;

pulsation generation request detection means for detecting existence or nonexistence of a request to enhance exhaust pressure pulsation;

exhaust volume adjustment means for adjusting an exhaust system volume; and pulsation generation state acquisition means for acquiring a judgment time point at which exhaust pressure pulsation is judged to have been enhanced, or a prediction time point at which exhaust pressure pulsation is predicted to have been enhanced;

wherein the nozzle opening degree control means includes nozzle closing control execution means for controlling the opening degree of the variable nozzle to be a first predetermined opening degree, which is on a closing side with respect to the opening degree of the variable nozzle at a detection time point at which a request to enhance exhaust pressure pulsation is detected, for a duration from the detection time point to the judgment time point or the prediction time point;

wherein the overlap period control means includes:

overlap period limiting means for controlling the valve overlap period to be shorter than the valve overlap period at the detection time point, for the duration from the detection time point to the judgment time point or the prediction time point; and overlap period setting means for setting a valve overlap period so as to overlap with a timing at which a trough of exhaust pressure pulsation comes, after the judgment time point or the prediction time point is passed; and wherein the exhaust volume adjustment means temporarily expands the exhaust system volume over a predetermined time period of which a starting point or an ending point is the starting time point to set a valve overlap period by the overlap period setting means, or a predetermined time period which includes the starting time point of the setting.

A second aspect of the present invention is the control apparatus for the internal combustion engine according to the first aspect of the present invention, the control apparatus further comprising:

an exhaust gas recirculation passage which makes the exhaust passage and an intake passage communicate with each other; and an EGR valve which is disposed in a middle of the exhaust gas recirculation passage and controls a quantity of exhaust gas recirculation from the exhaust passage to the intake passage, and wherein the exhaust volume adjustment means is a changeover valve which is disposed in the exhaust gas recirculation passage on an exhaust passage side of the EGR valve, and switches the exhaust passage and the exhaust gas recirculation passage between a communicating state and a blocking state.

A third aspect of the present invention is the control apparatus for the internal combustion engine according to the first or second aspect of the present invention, wherein the request to enhance exhaust pressure pulsation is an acceleration request of the internal combustion engine, and wherein the pulsation generation request detection means detects the request based on a change in an accelerator press-down degree.

A fourth aspect of the present invention is the control apparatus for the internal combustion engine according to any one of the first to the third aspects of the present invention, wherein the overlap period limiting means limits the valve overlap period to be zero or substantially zero for the duration from the detection time point to the judgment time point or the prediction time point.

A fifth aspect of the present invention is the control apparatus for the internal combustion engine according to any one of the first to the fourth aspects of the present invention, wherein the nozzle opening degree control means further includes nozzle opening degree control execution means for controlling the opening degree of the variable nozzle to be a second predetermined opening degree which is at an opening side with respect to the first predetermined opening degree, after the judgment time point is passed, and the overlap period setting means sets a valve overlap period so as to overlap with a timing at which the trough of exhaust pressure pulsation comes, after the opening degree of the variable nozzle is controlled so as to be the second predetermined opening degree by the nozzle opening degree control execution means.

ADVANTAGES OF THE INVENTION

According to the first aspect of the present invention, when a request for the enhancement of exhaust pressure pulsation is made, an increase in the quantity of intake air can be promoted by controlling the opening degree of the variable nozzle toward the closing side, thereby enhancing the exhaust pressure pulsation at an early period. Further, according to the present invention, when the request is made, a blow-back of exhaust gas to the intake side can be well prevented by controlling the valve overlap period to be shorter. Thus, according to the present invention, it is possible to generate exhaust pressure pulsation at an early period while suppressing the degradation of the volumetric efficiency. Moreover, in the present invention, after the judgment time point at which the exhaust pressure pulsation is judged to have been enhanced, or a prediction time point at which exhaust pressure pulsation is predicted to be enhanced is passed; when the valve overlap period is set so as to overlap with a timing at which the trough of the exhaust pressure pulsation comes, the exhaust system volume is temporarily expanded over a predetermined time period of which the starting point or ending point is the starting time point to set the valve overlap period, or the predetermined time period which includes the starting time point of the setting. This makes it possible to effectively utilize the scavenging effect while softening a torque difference.

According to the second aspect of the present invention, it becomes possible to well adjust the exhaust system volume by using the changeover valve which is disposed in the exhaust gas recirculation passage at the exhaust passage side of the EGR valve disposed in the middle of the exhaust gas recirculation passage and switches the exhaust passage and the exhaust gas recirculation passage between the communicating state and the blocking state.

According to the third aspect of the present invention, it is possible to generate exhaust pressure pulsation at an early period while suppressing the degradation of the volumetric efficiency when the acceleration request for the internal combustion engine is made. Further, it is possible to effectively utilize the scavenging effect while softening a torque difference.

According to the fourth aspect of the present invention, it is possible to generate exhaust pressure pulsation at an early period while suppressing a blow-back of exhaust gas to the intake side securely when the request for the enhancement of exhaust pressure pulsation is made.

According to the fifth aspect of the present invention, it becomes possible to provide a valve overlap period after an area in which the intake pressure is higher with respect to the exhaust pressure at near the exhaust top dead center is securely ensured. This makes it possible to sufficiently utilize the scavenging effect while avoiding the occurrence of a blow-back of exhaust gas to the intake side.

DESCRIPTION OF SYMBOLS 10 diesel engine
18 exhaust manifold
20 exhaust passage
22 variable nozzle type turbocharger
22a turbine
22b compressor
22c variable nozzle
26 intake passage
32 intake manifold
38 EGR passage 42 EGR valve
44 changeover valve
46 intake variable valve mechanism
48 exhaust variable valve mechanism
50 intake cam angle sensor
52 exhaust cam angle sensor
54 accelerator press-down degree sensor
56 intake pressure sensor
58 exhaust pressure sensor
60 ECU (Electronic Control Unit)
62 crank angle sensor

BEST MODE FOR CARRYING OUT THE INVENTION

First Embodiment

[System Configuration of First Embodiment]

Figure 1:
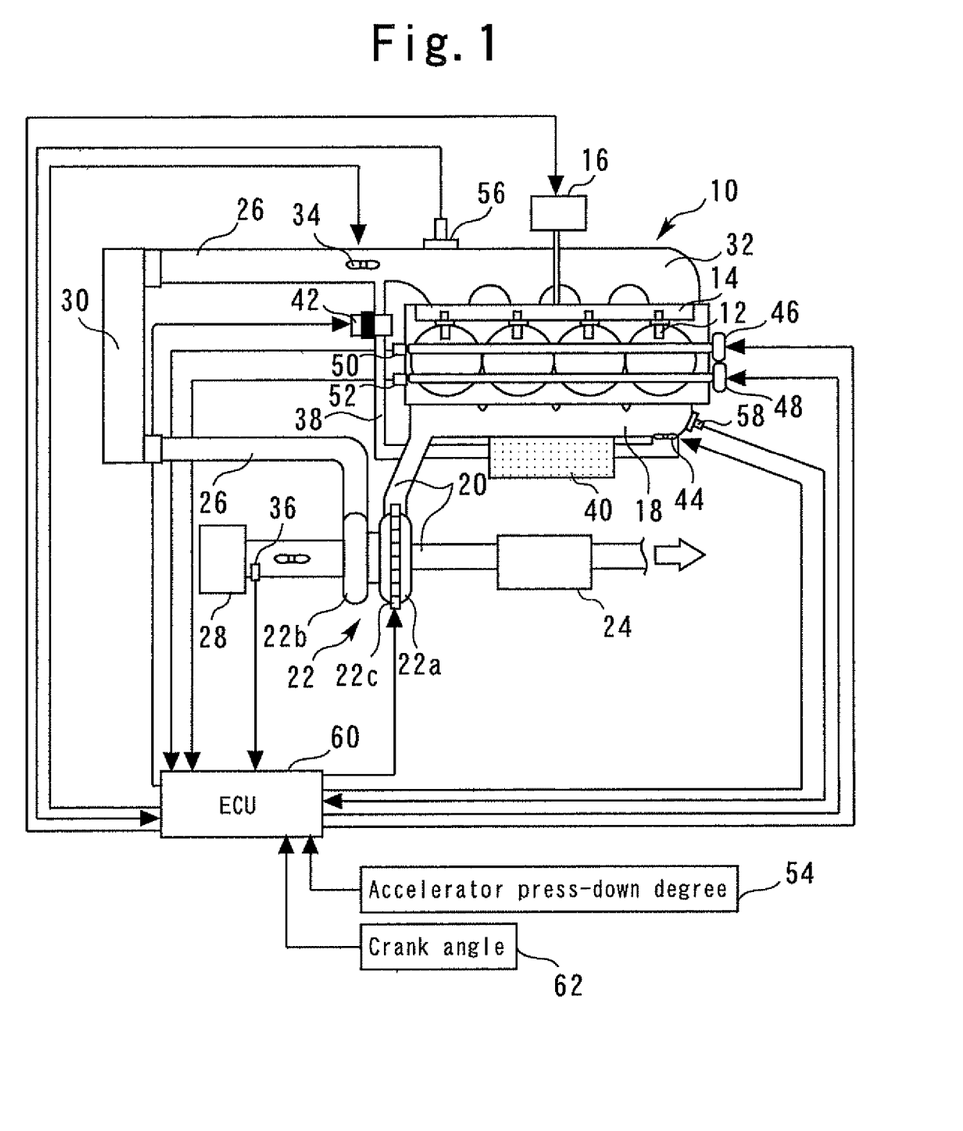
FIG. 1 is a diagram for explaining a system configuration of a first embodiment of the present invention.
Figure 2:
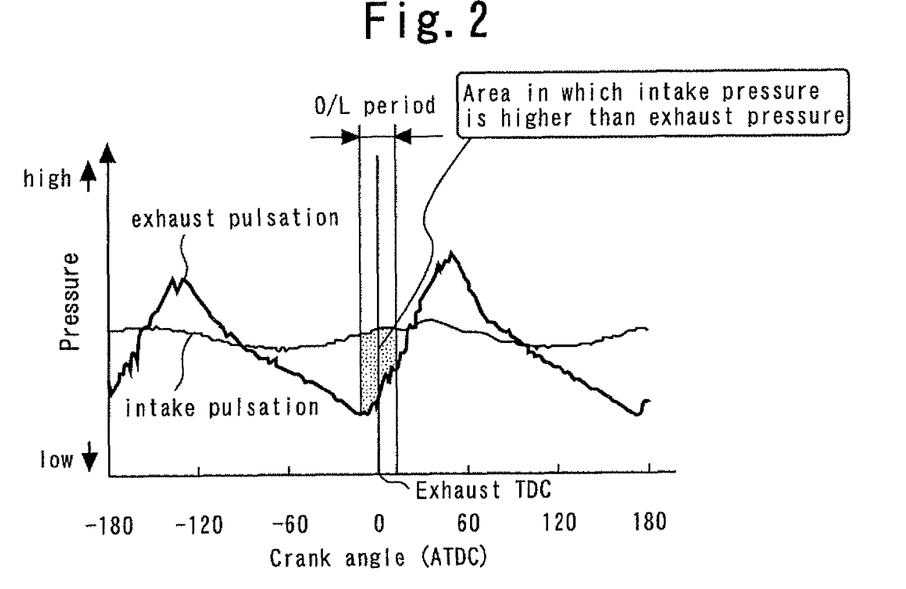
FIG. 2 is a diagram showing a relation of the intake manifold pressure and the exhaust manifold pressure with respect to the crank angle while the volumetric efficiency improvement control is being executed.

FIG. 1 is a diagram for explaining a system configuration of a first embodiment of the present invention. The system shown in FIG. 1 includes a 4-cycle diesel engine (compression ignition internal combustion engine) 10. It is assumed that the diesel engine 10 is mounted in a vehicle and works as its power source. Although the diesel engine 10 of the present embodiment is of an in-line 4 cylinder scavenging effect; and as a result of the valve overlap period being provided, a blow-back of the exhaust gas to the intake port side occurs. As a result, compared with a case in which the opening degree of the variable nozzle 22c is controlled so as to be nearly fully closed and the valve overlap period is not provided at the time of acceleration, the volumetric efficiency ηv is degraded. Hereafter, these problems will be further described in detail with reference to FIG. 4.

Figure 4:
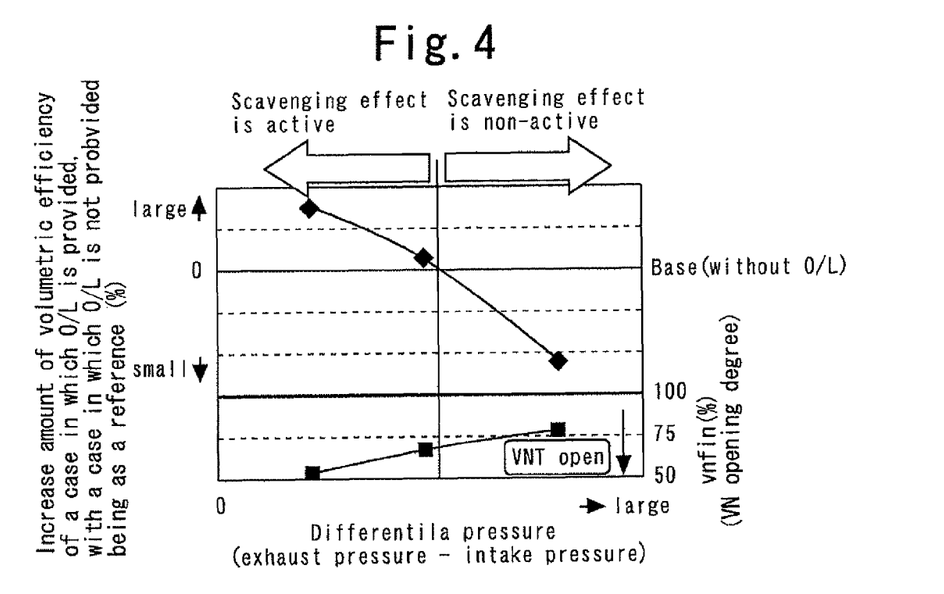
FIG. 4 is a diagram for explaining the effect of the opening degree of the variable nozzle on the scavenging effect described by using above-described FIG. 2.

FIG. 4 is a diagram for explaining the effect of the opening degree of the variable nozzle 22c on the scavenging effect described by using above-described FIG. 2. Note that an increase amount of the volumetric efficiency ηv in FIG. 4 means an increase amount of the volumetric efficiency η v of a case in which the valve overlap period is provided, with a case in which the valve overlap period is not provided being as a reference (zero).

Since the exhaust pressure rises as the opening degree of the variable nozzle 22c (VN opening degree) approaches a fully closed state, it is seen that, as shown in FIG. 4, the differential pressure (exhaust pressure–intake pressure) increases. Thus, as the VN opening degree is controlled toward the closing side, the exhaust pressure goes up too much, thereby degrading turbo efficiency. Since type, the number and arrangement of cylinders in the diesel engine in the present invention is not limited to the foregoing.

An injector 12 directly injecting fuel into the cylinder is installed in each cylinder of the diesel engine 10. The injector 12 of each cylinder is connected to a common common-rail 14. In the common-rail 14, a high pressure fuel which is pressurized by a supply pump 16 is stored. Then, from this common-rail 14, the fuel is supplied to the injector 12 of each cylinder. The exhaust gas discharged from each cylinder is collected by an exhaust manifold 18 to flow into an exhaust passage 20.

The diesel engine 10 includes a variable nozzle type turbocharger 22. The turbocharger 22 includes a turbine 22a which is operated by the exhaust energy of exhaust gas, and a compressor 22b which is integrally coupled to the turbine 22a and is driven to rotate by the exhaust energy of the exhaust gas input to the turbine 22a. Further, the turbocharger 22 includes a variable nozzle (VN) 22c for adjusting the flow rate of the exhaust gas supplied to the turbine 22a.

The variable nozzle 22c can perform a switching action by means of an actuator (for example, an electric motor) which is not shown. Decreasing the opening degree of the variable nozzle 22c reduces the inlet area of the turbine 22a, thereby allowing the flow speed of the exhaust gas, which is to be blown against the turbine 22a, to be increased. As a result, the rotational speed of the compressor 22b and turbine 22a (hereafter referred to as a "turbo rotational speed") increases, and thus the boost pressure can be increased. On the contrary, increasing the opening degree of the variable nozzle 22c increases the inlet area of the turbine 22a, thereby decreasing the flow speed of the exhaust gas to be blown against the turbine 22a. As a result, since the turbo rotational speed decreases, the boost pressure can be decreased.

The turbine 22a of the turbocharger 22 is disposed in the middle of the exhaust passage 20. A DPF 24 for trapping Particulate Matter (PM) in the exhaust gas is installed at a downstream side of the turbine 22a in the exhaust passage 20. Note that besides the DPF 24, a catalyst for purifying hazardous components in the exhaust gas may be installed in the exhaust passage 20. Alternatively, catalytic components may be supported by the DPF 24.

An air cleaner 28 is provided in the vicinity of the inlet of an intake passage 26 of the diesel engine 10. The air suctioned through the air cleaner 28 is compressed by the compressor 22b of the turbocharger 22 and thereafter is cooled by an intercooler 30. The suctioned air which has passed through the intercooler 30 is distributed by an intake manifold 32 to flow into each cylinder.

An intake throttle valve 34 is installed in the intake passage 26 between the intercooler 30 and the intake manifold 32. Moreover, an airflow meter 36 for detecting the quantity of intake air is installed near the downstream of the air cleaner 28 in the intake passage 26.

One end of an EGR passage 38 is connected to the vicinity of the intake manifold 32. The other end of the EGR passage 38 is connected to the exhaust manifold 18 of the exhaust passage 20. In the present system, part of the exhaust gas (burnt gas) can be recirculated to the intake passage 26 through the EGR passage 38, that is external EGR (Exhaust Gas Recirculation) can be performed.

In the middle of the EGR passage 38, an EGR cooler 40 is provided for cooling the exhaust gas (EGR gas) which passes through the EGR passage 38. An EGR valve 42 is provided at the downstream of the EGR cooler 40 in the EGR passage 38. By changing the opening degree of the EGR valve 42, the quantity of exhaust gas which passes through the EGR passage 38, that is, the quantity of external EGR gas can be adjusted.

Further, in the connecting portion between the exhaust manifold 18 and the EGR passage 38, a changeover valve 44 is installed for adjusting the exhaust system volume (more specifically, the exhaust system volume of the part at the upstream of the turbine 22a). The changeover valve 44 is configured to be able to block the EGR passage 38 at the upstream side of the EGR valve 42 and further the EGR cooler 40 (at the exhaust manifold 18 side).

Since the volumes of the EGR passage 38 and the EGR cooler 40 are not included in the exhaust system volume in a state in which the exhaust manifold 18 and the EGR passage 38 are blocked from each other by such changeover valve 44, the exhaust system volume can be reduced by the volumes of the EGR passage 38 and the EGR cooler 40 combined compared to when the valve is open. Thus, according to the changeover valve 44, it is possible to make the exhaust system volume variable.

Moreover, the diesel engine 10 includes an intake variable valve mechanism 46 which makes valve opening characteristics of an intake valve (not shown) variable, and an exhaust variable valve mechanism 48 which makes the opening characteristics of an exhaust valve (not shown) variable. The concrete configurations of the intake variable valve mechanism 46 and the exhaust variable valve mechanism 48 are not specifically limited, and besides a phase variable mechanism which makes an opening and closing timing continuously variable by changing the phase of a camshaft, a mechanism which drives a cam with an electric motor, an electromagnetic drive valve, a hydraulic drive valve, or the like may be used. According to the intake variable valve mechanism 46 and the exhaust variable valve mechanism 48, the length of a valve overlap period in which an open period of the exhaust valve and an open period of the intake valve overlaps with each other (hereafter, simply referred to as a "valve overlap period") can be changed.

Moreover, an intake cam angle sensor 50 and an exhaust cam angle sensor 52, which detects the rotation angle of each camshaft, that is, an intake cam angle and an exhaust cam angle, are disposed respectively in the vicinity of the intake camshaft and the exhaust camshaft.

Moreover, the system of the present embodiment further includes an accelerator press-down degree sensor 54 which detects a depression amount of an accelerator pedal (an accelerator press-down degree) of the vehicle equipped with the diesel engine 10, an intake pressure sensor 56 for detecting an intake manifold pressure (intake pressure), an exhaust pressure sensor 58 for detecting an exhaust manifold pressure (exhaust pressure), and an ECU (Electronic Control Unit) 60. Moreover, the ECU 60 is connected with a crank angle sensor 62 for detecting a crank angle as well as the various sensors and actuators described above. The ECU 60 can also calculate an engine speed based on a detection signal of the crank angle sensor 62. Further, the ECU 60 can calculate advance angle quantities of the opening and closing timing of the intake valve and the exhaust valve based on detection signals of the above-described cam angle sensors 50 and 52. The ECU 60 controls the operating state of the diesel engine 10 by actuating each actuator according to predetermined programs based on the output of each sensor.

[Volumetric Efficiency Improvement Control by Utilization of Exhaust Pressure Pulsation]

Being provided with the above-described intake variable valve mechanism 46 and the exhaust variable valve mechanism 48, the system of the present embodiment can arbitrarily adjust the valve overlap period. As a result of this, in the system of the present embodiment, a volumetric efficiency improvement control which improves the volumetric efficiency $\eta v$ (in cylinder air quantity) of the diesel engine 10 by utilizing pulsation of the exhaust manifold pressure in a predetermined operating range (for example, a low speed and high load range) can be executed. FIG. 2 is a diagram showing a relation of the intake manifold pressure and the exhaust manifold pressure with respect to the crank angle while the volumetric efficiency improvement control is being executed.

As shown in FIG. 2, the intake manifold pressure stays at a substantially constant pressure regardless of the crank angle. In contrast to this, the exhaust manifold pressure pulsates (periodically varies) as the exhaust gas is intermittently discharged through the exhaust valve of each cylinder. To be more specific, as the exhaust valve opening timing retards, the timing at which the exhaust gas is released into the exhaust manifold 18 retards, and the waveform of the exhaust manifold pressure pulsation shifts to the right side in FIG. 2. That is, changing the exhaust valve opening timing causes the waveform of the exhaust manifold pressure pulsation to move from side to side in FIG. 2. Moreover, the waveform of the exhaust manifold pressure pulsation is also caused to change by the occurrence of a change in the flow speed of the exhaust gas flowing in the exhaust manifold associated with a change in the engine speed.

The waveforms shown in FIG. 2 indicate a state in which the exhaust valve opening timing is controlled taking into consideration the relationship with engine rotational speed such that a trough part of the exhaust manifold pressure pulsation coincides with the valve overlap period (O/L period) which is present near the exhaust top dead center (TDC). Moreover, the waveforms shown in FIG. 2 indicate a state in which the intake pressure (boost pressure) is increased with respect to the exhaust pressure as a result of supercharging being performed at a state in which turbo efficiency is high. In such a state, the area represented by applying a hatch pattern in FIG. 2, that is, an area in which the intake pressure is higher than the exhaust pressure in the valve overlap period, is sufficiently ensured. As a result, the inflow of fresh air into the cylinder is facilitated and the effect of quickly expelling the burnt gas in the cylinder to the exhaust port by the inflow fresh air (so called, a scavenging effect) can be sufficiently achieved.

The scavenging effect as described above increases with the increase of the area represented by applying a hatch pattern in FIG. 2. Therefore, if the adjustment of the valve overlap period, which is based on the adjustment of the intake valve opening timing by use of the intake variable valve mechanism 46 and the adjustment of the exhaust valve closing timing by use of the exhaust variable valve mechanism 48, is performed to secure this area more widely, it becomes possible to achieve an enough scavenging effect. In this way, by performing the volumetric efficiency improvement control which utilizes the scavenging effect, it is made possible to sufficiently reduce the quantity of residual gas and thereby increase, by an equivalent amount, the quantity of fresh air to be charged into the cylinder. That is, the volumetric efficiency $77v$ can be increased. As a result, the torque of the diesel engine 10 can be well improved.

[Problems when Applying Volumetric Efficiency Improvement Control to a System Including a Variable Nozzle Type Turbocharger]

Figure 3:
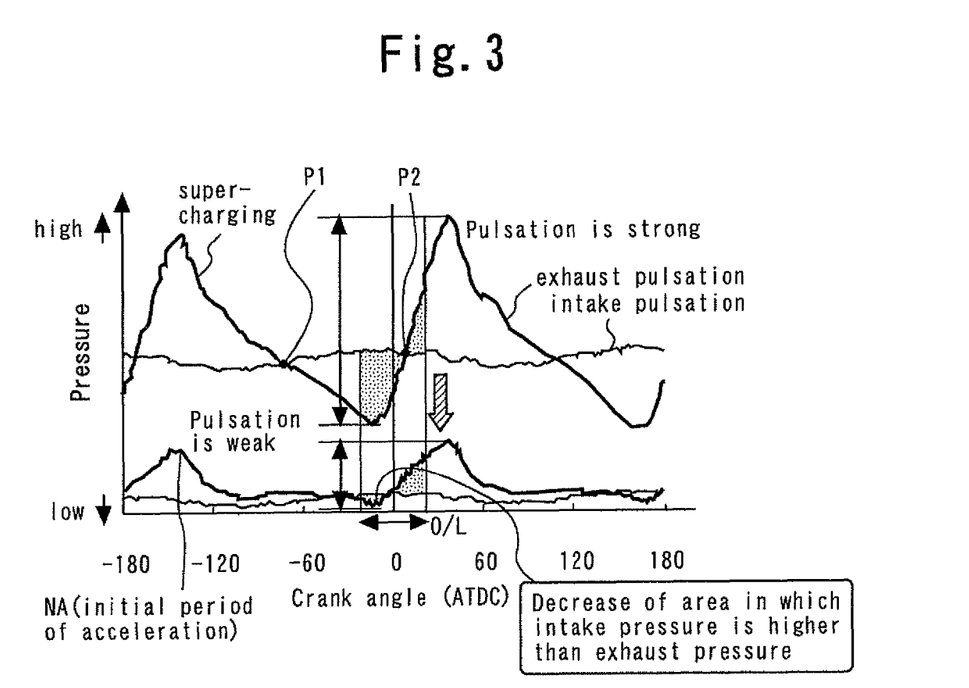
FIG. 3 is a diagram for explaining the effect of the strength of the exhaust pressure pulsation on the above-described volumetric efficiency improvement control.

FIG. 3 is a diagram for explaining the effect of the strength of the exhaust pressure pulsation on the above-described volumetric efficiency improvement control.

FIG. 3 shows a case in which the quantity of intake air is small (in other words, engine load is low) and no exhaust pressure pulsation of a sufficient strength is generated, such as in an initial period of acceleration. Moreover, FIG. 3 shows a case in which the quantity of intake air has increased (in other words, engine load has become high) and a sufficiently strong exhaust pressure pulsation is generated, and in which as a result of the turbocharger 22 being used in a state of a high turbo efficiency, the intake pressure is favorably increased relative to the exhaust pressure. To be more specific, as the load of the diesel engine 10 increases attended with a supercharging as a result of a request being made for shifting from an operating condition of a weak exhaust pressure pulsation such as an initial period of acceleration as shown by a waveform of lower side in FIG. 3 to a high load condition; the exhaust pressure pulsation is enhanced as well as the intake pressure (boost pressure) is favorably increased relative to the exhaust pressure as shown by the waveform shown on the upper side in FIG. 3.

As shown by the waveform on the lower side in FIG. 3, in a state in which the exhaust pressure pulsation is weak (the amplitude of the pulsation is small), the area in which the intake pressure is higher than the exhaust pressure is decreased in the vicinity of the exhaust top dead center in which the valve overlap period is provided. Because of this, in this case, the scavenging effect is decreased, thereby making it impossible to achieve a satisfactory effect offered by the above-described volumetric efficiency improvement control.

The system of the present embodiment, as already described, includes the variable nozzle type turbocharger 22. In a conventional internal combustion engine equipped with such a turbocharger, a control is performed such that in order to rapidly increase the torque of the internal combustion engine at the time of acceleration, the opening degree of the variable nozzle is controlled so as to be nearly fully closed to increase the boost pressure, thereby increasing the quantity of intake air. However, the system of the present embodiment includes the variable valve mechanisms 46 and 48 which make the valve overlap period adjustable, as well as such variable nozzle type turbocharger 22.

In the system of the present embodiment having the configuration as described above, if the valve overlap period is provided in a state in which the opening degree of the variable nozzle 22c is controlled so as to be nearly fully closed at the time of acceleration, a sufficient scavenging effect as described above cannot not be achieved since the exhaust pressure pulsation is weak in an initial period of acceleration.

Moreover, at the time of acceleration, if the valve overlap period is provided in a state in which the opening degree of the variable nozzle 22c is controlled so as to be nearly fully closed, as a result of the opening degree of the variable nozzle 22c being controlled so as to be nearly fully closed, exhaust pressure is caused to increase during acceleration, thereby making it harder to achieve the low turbo efficiency prevents the intake pressure from favorably going up relative to the exhaust pressure, achieving an enough scavenging effect becomes harder, and the area in which the intake pressure is higher than the exhaust pressure is decreased. As a result, if the VN opening degree is controlled toward the closing side, the scavenging effect described above is lost, thereby degrading the volumetric efficiency ηv compared with a case in which the valve overlap period is not provided.

In contrast to this, if the VN opening degree is controlled toward the opening side, turbo efficiency is improved and thus the intake pressure is favorably increased relative to the exhaust pressure, thereby allowing the scavenging effect described above to be sufficiently achieved. Because of this, as seen from FIG. 4, as the VN opening degree is controlled toward the opening side, the volumetric efficiency ηv is favorably improved compared with a case in which the valve overlap period is not provided. However, if the opening degree of the variable nozzle 22c is controlled so as to become a certain opening degree in the opening side in an initial period of acceleration in which the quantity of intake air is small, the time period required for the exhaust pressure pulsation to become strong is prolonged.

[Characteristic Features of First Embodiment]

Figure 5:
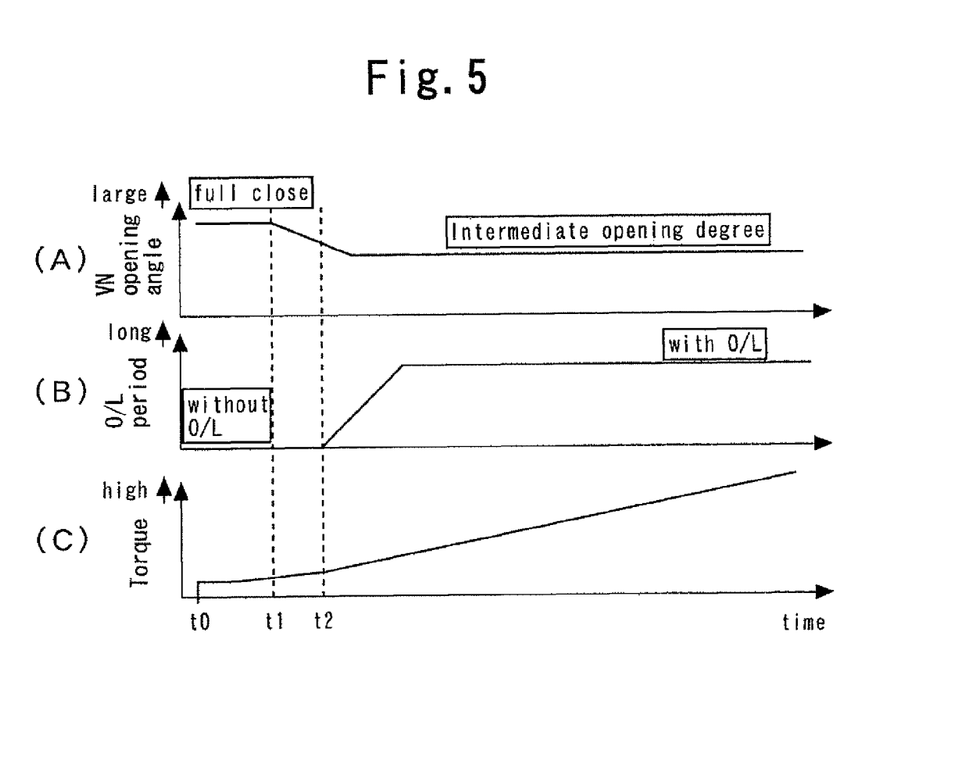
FIG. 5 is a time chart to illustrate a characteristic control in the first embodiment of the present invention.

FIG. 5 is a time chart to illustrate a characteristic control in the first embodiment of the present invention.

In the system of the present embodiment, a control described below is performed in the beginning of acceleration in which a request requiring a strong exhaust pressure pulsation is to be made, in order to solve the various problems described above, in the configuration Including the variable nozzle type turbocharger 22 and the variable valve mechanisms 46 and 48 which make the valve overlap period adjustable.

That is, in the present embodiment, arrangement is made as follows: at a time point t0 at which an acceleration request from the driver is detected, the variable nozzle 22c is controlled such that the VN opening degree is fully closed as shown in FIG. 5(A), and the variable valve mechanisms 46 and 48 are controlled such that the valve overlap period is zero as shown in FIG. 5(B). Note that in the control example shown in FIG. 5, an example in which at the detection time point t0 of acceleration request, the VN opening degree and the valve overlap period have already been controlled as described above is used for the sake of convenience.

In the present embodiment, in a duration until a time point t1 is reached at which the exhaust pressure pulsation can be judged to have become strong, that is, in an initial period of acceleration, the control to make the VN opening degree fully closed and the valve overlap period zero as described above is continued. As a result, the torque of the diesel engine 10 starts going up gradually as shown in FIG. 5(C).

Thereafter, when the above-described time point t1 at which the exhaust pressure pulsation can be judged to have become strong is reached, the VN opening degree starts to be opened toward a predetermined intermediate opening degree (to be more specific, an opening degree with a high turbo efficiency). On the other hand, the valve overlap period is still kept at zero at this time point t1. The adjustment of the valve overlap period is started when a time point t2 is reached, at which it is judged that a condition in which the intake pressure is higher than the exhaust pressure is achieved as a result of the turbo efficiency being improved as the time elapses thereafter. To be more specific, the valve overlap period starts to be expanded so as to overlap with a timing at which the trough of the exhaust pressure pulsation comes.

Figure 6:
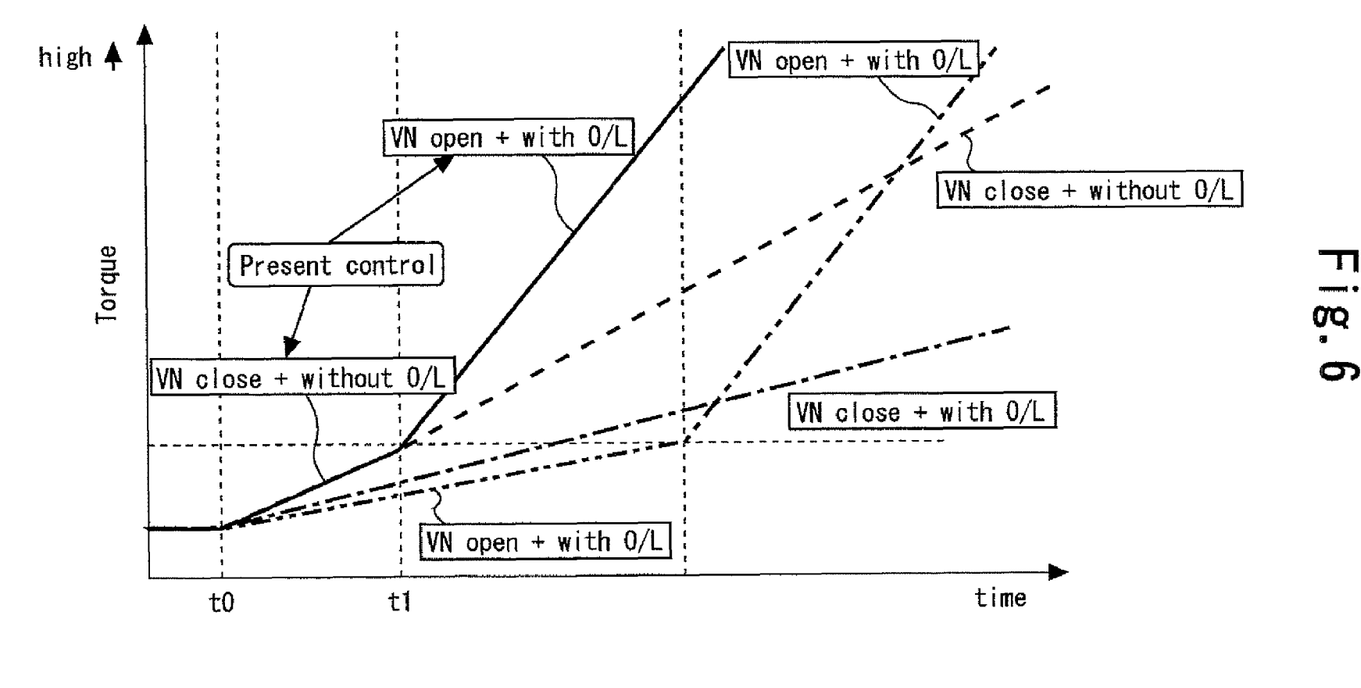
FIG. 6 is a conceptual diagram to illustrate the effect to be obtained by the execution of the control shown in above-described FIG. 5.

FIG. 6 is a conceptual diagram to illustrate the effect to be obtained by the execution of the control shown in above-described FIG. 5. Note that in FIG. 6, the waveform represented by a solid line corresponds to the control of the present embodiment described above. Moreover, the waveform represented by a broken line corresponds to the control in the case in which the VN opening degree is kept fully closed at the time of acceleration in an internal combustion engine which does not include any adjustment mechanism of the valve overlap period. Further, the waveform represented by an one-dot chain line corresponds to the control in the case in which from the start of acceleration, the VN opening degree is kept fully closed and the valve overlap period is provided. Further, the waveform represented by a two-dot chain line corresponds to the control in the case in which from the start of acceleration, the VN opening degree is kept at a constant opening degree and the valve overlap period is provided.

The control of the present embodiment can achieve an excellent effect as described below with respect to the other controls shown in FIG. 6.

First, the control of the present embodiment (solid line) is compared with the control represented by the broken line. As shown in FIG. 6, since the control represented by the broken line is identical with the control of the present embodiment in an initial stage of acceleration, there is no difference between them. However, while in the control of the present embodiment, the VN opening degree is opened at the time point t1 at which the exhaust pressure pulsation is judged to have become strong and thereafter the valve overlap period is set; in the control represented by the broken line, no valve overlap period remains to be provided even after the above-described time point t1. For this reason, the control represented by the broken line results in that the rise in the torque takes more time relative to the control of the present embodiment due to the lack of utilization of the scavenging effect through the exploitation of an enhanced exhaust pressure pulsation.

Next, the control of the present embodiment (solid line) is compared with the control represented by the one-dot chain line. In the control represented by the one-dot chain line, since, on the grounds that the exhaust pressure pulsation is weak, the valve overlap period is set in an initial stage of acceleration in which the intake pressure does not become higher relative to the exhaust pressure; the volumetric efficiency ηv is degraded due to a blow-back of the exhaust gas to the intake side. Further, in the control represented by the one-dot chain line, since, as a result of the VN opening degree being kept fully closed even after an intermediate period of acceleration in which the exhaust pressure pulsation becomes strong, turbo efficiency is degraded and the intake pressure cannot be sufficiently raised relative to the exhaust pressure; the scavenging effect becomes harder to achieve and the volumetric efficiency ηv is degraded due to a blow-back of the exhaust gas to the intake side. For this reason, the control represented by the one-dot chain line also results in that the rise in the torque takes more time and the magnitude of the torque itself cannot be sufficiently raised relative to the control of the present embodiment.

Next, the control of the present embodiment (solid line) is compared with the control represented by the two-dot chain line. In the control represented by the two-dot chain line, as a result of the VN opening degree being kept at a constant opening degree in an initial stage of acceleration, the time period required for the exhaust pressure pulsation to become strong is prolonged compared with the control of the present embodiment. For this reason, the control represented by the two-dot chain line results in that the rise in the torque takes more time relative to the control of the present embodiment due to such delay time in the generation of the exhaust pressure pulsation.

As so far described, according to the control of the present embodiment, an increase in the quantity of intake air can be promoted by controlling the VN opening degree to be fully closed, thereby enhancing the exhaust pressure pulsation at an early period, and thus it becomes possible to utilize the scavenging effect at an early period. Further, as a result of the valve overlap period being set to zero in an initial period of acceleration, it becomes possible to favorably prevent the degradation of the volumetric efficiency ηv caused by a blow-back of the exhaust gas to the intake side.

Moreover, according to the control of the present embodiment, after an intermediate period of acceleration with an enhanced exhaust pressure pulsation, as a result of the VN 22c being opened to an opening degree with a high turbo efficiency, the exhaust pressure can be decreased relative to the intake pressure (boost pressure), thereby making it possible to sufficiently utilize the scavenging effect. Moreover, it is possible to combine the realization of such scavenging effect and the securement of turbo efficiency.

Further, according to the control of the present embodiment, because of the arrangement that the timing of setting the valve overlap period in an intermediate period of acceleration is after the opening operation of the VN opening degree, it becomes possible to provide the valve overlap period after the area in which the intake pressure becomes higher relative to the exhaust pressure in the vicinity of the exhaust top dead center is securely ensured. As a result of this, it becomes possible to sufficiently utilize the scavenging effect while avoiding the occurrence of a blow-back of the exhaust gas to the intake side.

[Method to Soften a Torque Difference in the Beginning of Utilization of the Scavenging Effect]

Figure 7:
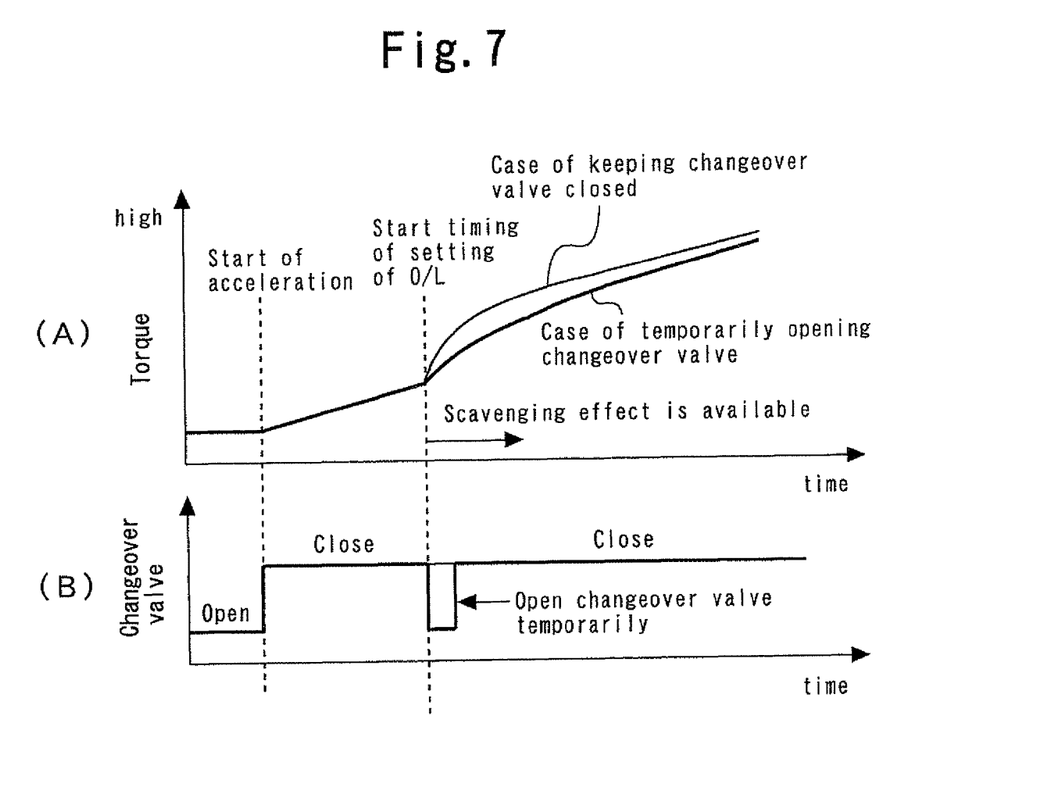
FIG. 7 is a diagram to illustrate problems of the control shown in above-described FIG. 5.

FIG. 7 is a diagram to illustrate problems of the control shown in above-described FIG. 5.

According to the control of the present embodiment described above, it becomes possible to significantly increase the torque of the diesel engine 10 at the time of acceleration by utilizing the scavenging effect. However, a time period during which such scavenging effect can be effectively utilized is a period subsequent to an intermediate period of acceleration after the valve overlap period is set following the exhaust pressure pulsation having been sufficiently enhanced. In other words, at the timing at which the setting of the valve overlap period is started in order to utilize the scavenging effect, the torque significantly increases. As a result, as represented by a thin line in FIG. 7(A), there is a concern that a torque difference occurs in association with the start of the setting of the valve overlap period.

Then, in the present invention, arrangement is made such that the exhaust system volume is adjusted by using the changeover valve 44 at the time of acceleration in order to soften a torque difference in the beginning of the utilization of the scavenging effect. To be more specific, as shown in FIG. 7(B), first, when a request to enhance the exhaust pressure pulsation is detected in an initial period of acceleration, the changeover valve 44 is closed to decrease the exhaust system volume. As a result of this, it becomes possible to effectively enhance the exhaust pressure pulsation.

Following that, in the present embodiment, arrangement is made such that as shown in FIG. 7(B), the changeover valve 44 is temporarily opened over several cycles of the diesel engine 10 (over a predetermined time period) at the timing of setting the valve overlap period for the utilization of the scavenging effect. Then, after the aforementioned several cycles have passed, the changeover valve 44 is closed again so that the utilization of the scavenging effect is maximized in the following acceleration period.

According to the control described so far, as a result of the temporary opening of the changeover valve 44 at the above-described setting timing of the valve overlap period, the exhaust pressure pulsation is temporarily weakened. This makes it possible to temporarily decrease the scavenging effect at the start of the setting of the valve overlap period. As a result of this, as shown by a thick line in FIG. 7(A), it is possible to improve the acceleration (torque rise) thereafter, while softening a torque difference. Further adding to that, according to such control of the changeover valve 44, since the exhaust pressure pulsation is decreased by temporarily decreasing the exhaust system volume after the exhaust pressure pulsation has been sufficiently enhanced in advance, it becomes possible to utilize a strong exhaust pressure pulsation immediately after the changeover valve 44 is closed again. As a result of this, it becomes possible to sufficiently and highly maintain a final achievement level of the torque at the time of acceleration, while softening a torque difference in the beginning of the utilization of the scavenging effect.

Contrasted with the above-described method by use of the control of the changeover valve 44, it is also possible to soften a torque difference in the beginning of the setting of the valve overlap period by decreasing the quantity of fuel injection with the changeover valve 44 being closed. However, rather than such a method, the method to use the control of the changeover valve 44 described above has a merit in the aspect of fuel economy from the following reasons. That is, in a state of using the method to decrease a fuel injection quantity while keeping the changeover valve 44 closed, the exhaust pressure is higher (that is, pump loss is larger) than that in a state of performing the control of the changeover valve 44 described above. Therefore, when the method to decrease a fuel injection quantity is used, more fuel injection quantity is needed to output the same torque compared with the method to use the control of the changeover valve 44 described above. Because of this, the method to use the control of the changeover valve 44 described above has more merit in the aspect of fuel economy.

[Concrete Processing in First Embodiment]

Figure 8:
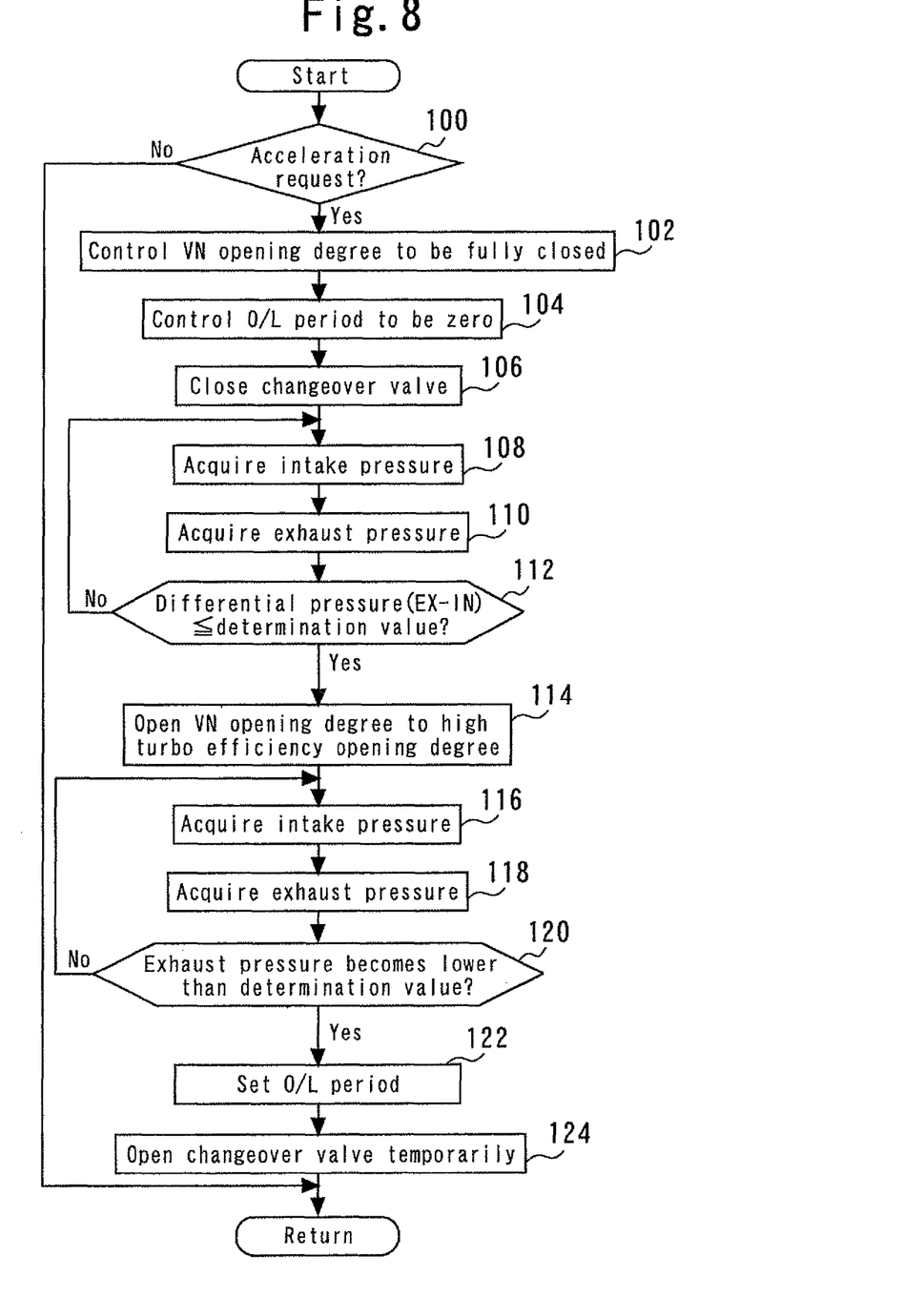
FIG. 8 is a flowchart illustrating a routine that is executed in the first embodiment of the present invention.

FIG. 8 is a flowchart of a routine to be executed by the ECU 60 to implement the control of the present embodiment described so far.

In the routine shown in FIG. 8, first, it is determined whether or not a vehicle acceleration request from the driver is present, on the basis of the output of the accelerator press-down degree sensor 54 (step 100). As a result of that, if it is determined that the acceleration request is present then the opening degree of the variable nozzle (VN) 22c is controlled so as to become fully closed from an opening degree at the current time (step 102) and the valve overlap period is controlled so as to become zero from a period at the current time (step 104). Further, in this case, the changeover valve 44 is closed to reduce the exhaust system volume (step 106).

Next, an intake pressure (an intake manifold pressure) is acquired on the basis of the output of the intake pressure sensor 56 (step 108), and an exhaust pressure (an exhaust manifold pressure) is acquired on the basis of the output of the exhaust pressure sensor 58 (step 110).

Next, it is determined whether or not the differential pressure between the exhaust pressure and the intake pressure has become a value not more than a predetermined determination value (step 112). This determination value is predetermined as a value for judging whether or not the exhaust pressure pulsation has become sufficiently strong. As a result, while the determination of present step 112 is negative, the control to make the VN opening degree fully closed, the control to make the valve overlap period zero, and the control to close the changeover valve 44 are to be continued, respectively.

On the other hand, if as a result of the determination in above-described step 112 being positive, it is judged that the exhaust pressure pulsation becomes sufficiently strong, then the VN opening degree is opened so as to be an intermediate opening degree which provides a high turbo efficiency (step 114). The ECU 60 stores a map (not shown) which defines VN opening degrees with high turbo efficiencies in relation with the operating conditions of the diesel engine 10 such as engine speed and intake air quantity. In present step 114, with reference to such a map, the VN opening degree is to be opened so as to be a certain opening degree with a high turbo efficiency in an operating condition after the acceleration request.

Next, an intake pressure and an exhaust pressure at the current time are acquired, respectively (steps 116 and 118). Then, it is determined whether or not the exhaust pressure becomes lower than a predetermined determination value (step 120). As a result of the execution of the control in which the VN opening degree is opened to be a certain opening degree with a high turbo efficiency in above-described step 114, the exhaust pressure starts to decrease. The determination value in present step 120 is a value predetermined as a value for judging whether or not the exhaust pressure is reduced to a condition in which the scavenging effect described with reference to above-described FIG. 2 can be sufficiently obtained.

As a result, if the determination of above-described step 120 is determined to be positive, that is, it can be judged that a pressure condition in which a sufficient scavenging effect can be obtained is fulfilled, a positive valve overlap period is set so as to overlap with a timing at which the trough of the exhaust pressure pulsation comes (step 122). To be more specific, present step 122 is executed to acquire crank angles at two intersections (see intersections P1 and P2 shown in FIG. 3) between the exhaust pressure and intake pressure at the trough of the exhaust pressure pulsation occurred in the vicinity of the exhaust top dead center, by utilizing the respective pressure waveforms of the intake pressure and exhaust pressure detected in above-described steps 116 and 118. Then the valve overlap period is adjusted by using the variable valve mechanisms 46 and 48 such that the intake valve opening timing becomes the above-described intersection P1 and the exhaust valve closing timing becomes the above-described intersection P2.

To be more specific, the positions (crank angles) of these intersections P1 and P2 change in association with a change in the VN opening degree in above-described step 114. This is because a change in the VN opening degree results in a change in the relation of the intake pressure with respect to the exhaust pressure. According to the processing of present step 122, the valve overlap period is gradually changed in accordance with the changes of the positions of the intersections P1 and p2 caused by a change in the VN opening degree. To be specific, according to the processing of present step 122, as the VN opening degree is opened, the area in which the intake pressure is higher than the exhaust pressure at the trough of the exhaust pressure pulsation generated near the exhaust top dead center expands gradually (in other words, the distance between the intersections P1 and P2 in FIG. 3 gradually moves away) and, accordingly, the valve overlap period gradually expands. Note that in present step 122, arrangement is made such that based on the respective detection values of the actual exhaust pressure and intake pressure, the above described intersections P1 and P2, which are crank angles which should be the intake valve opening timing and exhaust valve closing timing, are acquired. However, the method to acquire these intersections P1 and P2 is not limited to such method and the intersections P1 an P2 may be predetermined by experiment or the like in relation with, for example, the engine speed, VN opening degree, intake air quantity, engine load (torque ∝ fuel injection quantity), and exhaust valve opening timing. Then, the relation may be stored in the ECU 60 as a map so that the intersections P1 and P2 may be acquired with reference to such map in relation with the engine speed, VN opening degree, intake air quantity, engine load, and the exhaust valve opening timing in an actual internal combustion engine.

Moreover, if the determination of above-described step 120 is determined to be positive (that is, it can be judged that a pressure condition by which an enough scavenging effect can be obtained is fulfilled); further, the changeover valve 44 is temporarily opened over several cycles (a predetermined time period) (step 124).

According to the routine shown in FIG. 8 as described so far, when an acceleration request which is an example of the request to enhance the exhaust pressure pulsation is made, first, in an initial stage of acceleration, the VN opening degree is controlled so as to be fully closed and the valve overlap period is controlled so as to be zero. Moreover, in this case, the changeover valve 44 is closed. Thereafter, at the time point at which it can be judged that the exhaust pressure pulsation is enhanced, the VN opening degree is opened so as to be an opening degree with a high turbo efficiency. Then, after such opening operation of the VN 22c is conducted, at the time point when it can be judged that a pressure condition by which an enough scavenging effect can be obtained is achieved, the valve overlap period in accordance with the VN opening degree is set. Further, at the same time with the setting of the valve overlap period, the changeover valve 44 is to be temporarily opened. According to the processing described so far, it becomes possible to effectively utilize the scavenging effect at the time of acceleration request while softening a torque difference in the beginning of the utilization of the scavenging effect.

On the other hand, in the first embodiment, which has been described above, arrangement is made such that the changeover valve 44 is temporarily opened over a predetermined time period (several cycles) of which starting point is the starting time point to set the valve overlap period when utilizing a scavenging effect, to soften a torque difference in the beginning of the utilization of the scavenging effect. However, the predetermined time period, in which the exhaust system volume is temporarily expanded by the exhaust volume adjustment means in the present invention, is not limited to such setting, but for example may be a time period of which ending point is set to be the starting time point to set the valve overlap period. Further, the predetermined time period may be a time period which is set so as to include the starting time point to set the valve overlap period.

However, in order to start a temporary expansion of the exhaust system volume before the starting time point to set the valve overlap period by the methodology of the above described modified embodiment, it becomes necessary to predict a time point at which the exhaust pressure pulsation becomes sufficiently enhanced after a request to enhance the exhaust pressure pulsation is detected. Such prediction may be performed by, for example, the following method. That is, a map which defines the future strength of the exhaust pressure pulsation in relation with, for example, the VN opening degree, engine speed, and fuel injection quantity may be acquired in advance so that by referring to such a map, a time point at which the exhaust pressure pulsation will be sufficiently enhanced in the future may be predicted. Alternately, with the provision of means for measuring or estimating an exhaust pressure and an intake pressure respectively, the values of future exhaust pressure and intake pressure may be predicted by extrapolation based on the respective measured values (or estimated values) of the exhaust pressure and intake pressure of the current and past predetermined cycles. Then, based on the pressure difference thereof, a time point at which future exhaust pressure pulsation becomes sufficiently enhanced may be predicted.

Moreover, in the first embodiment, which has been described above, arrangement is made such that when the valve overlap period is set in association with the adjustment of the VN opening degree in an intermediate period of acceleration, the above described intersections P1 and P2 which should be the crank angles corresponding to the intake valve opening timing and the exhaust valve closing timing are acquired based on the respective detection values of an actual exhaust pressure and intake pressure so that the valve overlap period is gradually changed in accordance with the change of the intersections P1 and P2 caused by a change in the VN opening degree. However, the concrete method to set the valve overlap period to be performed in association with the adjustment of the VN opening degree in an intermediate period of acceleration is not limited to the foregoing. That is, a simple method may be used, in which, for example, when setting the valve overlap period, the advance angle quantity of intake valve opening timing and the retard angle quantity of exhaust valve closing timing are controlled at the same time and in the same quantity, and further the valve overlap period is gradually expanded as the VN 22c is opened.

Incidentally, in the first embodiment, which has been described above, the "overlap period control means" according to the first aspect of the present invention is implemented when the ECU 60 controls the valve overlap period by use of the intake variable valve mechanism 46 and the exhaust variable valve mechanism 48; the "nozzle opening degree control means" according to the first aspect of the present invention is implemented when the ECU 60 gives an actuator which is not shown a command to control the opening degree of the variable nozzle 22c; the "pulsation generation request detection means" according to the first aspect of the present invention is implemented when the ECU 60 executes the processing of above-described step 100; the "exhaust volume adjustment means" according to the first aspect of the present invention is implemented when the ECU 60 executes the processing of above-described steps 106 and 124; the "pulsation generation state acquisition means" according to the first aspect of the present invention is implemented when the ECU 60 executes the processing of above-described step 112; the "nozzle closing control execution means" according to the first aspect of the present invention is implemented when the ECU 60 executes the processing of above-described step 102; the "overlap period limiting means" according to the first aspect of the present invention is implemented when the ECU 60 executes the processing of above-described step 104; and the "overlap period setting means" according to the first aspect of the present invention is implemented when the ECU 60 executes the processing of above-described step 122. Moreover, the fully closed opening degree of the variable nozzle 22c corresponds to the "first predetermined opening degree" according to the first aspect of the present invention.

Further, the opening degree with a high turbo efficiency corresponds to the "second predetermined opening degree" according to the fifth aspect of the present invention. Moreover, the "nozzle opening control execution means" according to the fifth aspect of the present invention is implemented when the ECU 60 executes the processing of above-described step 114.

The invention claimed is:

1. A control apparatus for an internal combustion engine, the control apparatus comprising:
    a variable valve mechanism which makes variable a valve overlap period, in which an intake valve open period overlaps with an exhaust valve open period;
    overlap period control means for controlling the variable valve mechanism to control the valve overlap period;
    a turbocharger which includes a turbine driven by exhaust energy of the internal combustion engine, and a variable nozzle for adjusting an flow rate of exhaust gas supplied to the turbine;
    nozzle opening degree control means for controlling an opening degree of the variable nozzle;
    pulsation generation request detection means for detecting existence or nonexistence of a request to enhance exhaust pressure pulsation;
    exhaust volume adjustment means for adjusting an exhaust system volume; and
    pulsation generation state acquisition means for acquiring a judgment time point at which exhaust pressure pulsation is judged to have been enhanced, or a prediction time point at which exhaust pressure pulsation is predicted to have been enhanced;
    wherein the nozzle opening degree control means includes nozzle closing control execution means for controlling the opening degree of the variable nozzle to be a first predetermined opening degree, which is on a closing side with respect to the opening degree of the variable nozzle at a detection time point at which a request to enhance exhaust pressure pulsation is detected, for a duration from the detection time point to the judgment time point or the prediction time point;

wherein the overlap period control means includes:

overlap period limiting means for controlling the valve overlap period to be shorter than the valve overlap period at the detection time point, for the duration from the detection time point to the judgment time point or the prediction time point; and overlap period setting means for setting a valve overlap period so as to overlap with a timing at which a trough of exhaust pressure pulsation comes, after the judgment time point or the prediction time point is passed; and wherein the exhaust volume adjustment means temporarily expands the exhaust system volume over a predetermined time period of which a starting point or an ending point is the starting time point to set a valve overlap period by the overlap period setting means, or a predetermined time period which includes the starting time point of the setting.

2. The control apparatus for the internal combustion engine according to claim 1, the control apparatus further comprising:

an exhaust gas recirculation passage which makes an exhaust passage and an intake passage communicate with each other; and an EGR valve which is disposed in a middle of the exhaust gas recirculation passage and controls a quantity of exhaust gas recirculation from the exhaust passage to the intake passage, and wherein the exhaust volume adjustment means is a changeover valve which is disposed in the exhaust gas recirculation passage on an exhaust passage side of the EGR valve, and switches the exhaust passage and the exhaust gas recirculation passage between a communicating state and a blocking state.

3. The control apparatus for the internal combustion engine according to claim 1, wherein the request to enhance exhaust pressure pulsation is an acceleration request of the internal combustion engine, and wherein the pulsation generation request detection means detects the request based on a change in an accelerator press-down degree.

4. The control apparatus for the internal combustion engine according to claim 1, wherein the overlap period limiting means limits the valve overlap period to be zero or substantially zero for the duration from the detection time point to the judgment time point or the prediction time point.

5. The control apparatus for the internal combustion engine according to claim 1, wherein the nozzle opening degree control means further includes nozzle opening degree control execution means for controlling the opening degree of the variable nozzle to be a second predetermined opening degree which is at an opening side with respect to the first predetermined opening degree, after the judgment time point is passed, and the overlap period setting means sets a valve overlap period so as to overlap with a timing at which the trough of exhaust pressure pulsation comes, after the opening degree of the variable nozzle is controlled so as to be the second predetermined opening degree by the nozzle opening degree control execution means.

6. A control apparatus for an internal combustion engine, the control apparatus comprising:

a variable valve mechanism which makes variable a valve overlap period, in which an intake valve open period overlaps with an exhaust valve open period;

an overlap period control unit for controlling the variable valve mechanism to control the valve overlap period;

a turbocharger which includes a turbine driven by exhaust energy of the internal combustion engine, and a variable nozzle for adjusting an flow rate of exhaust gas supplied to the turbine;

a nozzle opening degree control unit for controlling an opening degree of the variable nozzle;

a pulsation generation request detection unit for detecting existence or nonexistence of a request to enhance exhaust pressure pulsation;

an exhaust volume adjustment unit for adjusting an exhaust system volume; and a pulsation generation state acquisition unit for acquiring a judgment time point at which exhaust pressure pulsation is judged to have been enhanced, or a prediction time point at which exhaust pressure pulsation is predicted to have been enhanced;

wherein the nozzle opening degree control unit includes nozzle closing control execution unit for controlling the opening degree of the variable nozzle to be a first predetermined opening degree, which is on a closing side with respect to the opening degree of the variable nozzle at a detection time point at which a request to enhance exhaust pressure pulsation is detected, for a duration from the detection time point to the judgment time point or the prediction time point;

wherein the overlap period control unit includes:

an overlap period limiting unit for controlling the valve overlap period to be shorter than the valve overlap period at the detection time point, for the duration from the detection time point to the judgment time point or the prediction time point; and an overlap period setting unit for setting a valve overlap period so as to overlap with a timing at which a trough of exhaust pressure pulsation comes, after the judgment time point or the prediction time point is passed; and wherein the exhaust volume adjustment unit temporarily expands the exhaust system volume over a predetermined time period of which a starting point or an ending point is the starting time point to set a valve overlap period by the overlap period setting unit, or a predetermined time period which includes the starting time point of the setting.

* * * * *